(12) United States Patent  
Monchanin et al.

(10) Patent No.: US 8,582,714 B2  
(45) Date of Patent: Nov. 12, 2013

(54) FIXED CLUSTER HAVING A SPIDER-LIKE SUPPORT, CORRESPONDING PRESSURIZED WATER NUCLEAR REACTOR CORE AND ASSEMBLY COMPRISING A NUCLEAR FUEL ASSEMBLY AND SUCH A FIXED CLUSTER

(75) Inventors: Michel Monchanin, Lyons (FR); Thierry Delannoy, Beynost (FR); Didier Pergue, Bron (FR); Roman Ferry, Villeurbanne (FR)

(73) Assignee: Areva NP, Courbevoie (FR)

( * ) Notice: Subject to any disclaimer, the term of this patent is extended or adjusted under 35 U.S.C. 154(b) by 969 days.

(21) Appl. No.: 12/448,340

(22) PCT Filed: Nov. 16, 2007

(86) PCT No.: PCT/FR2007/001883  
§ 371 (c)(1),  
(2), (4) Date: Jan. 19, 2010

(87) PCT Pub. No.: WO2008/081085  
PCT Pub. Date: Jul. 10, 2008

(65) Prior Publication Data  
US 2010/0111243 A1    May 6, 2010

(30) Foreign Application Priority Data  
Dec. 18, 2006  (FR) ...................................... 06 11036

(51) Int. Cl.  
*G21C 1/04* (2006.01)

(52) U.S. Cl.  
USPC ............ 376/353; 376/347; 376/352; 376/363

(58) Field of Classification Search  
USPC .......................... 376/347, 352, 353, 361–365  
See application file for complete search history.

(56) References Cited

U.S. PATENT DOCUMENTS

| 4,064,004 | A | * | 12/1977 | Long et al. ................... 376/440 |
| 4,208,247 | A | | 6/1980 | Impink, Jr. |
| 4,304,631 | A | | 12/1981 | Walton et al. |
| 4,820,475 | A | | 4/1989 | Mayers |
| 5,889,832 | A | | 3/1999 | Bonnamour et al. |

FOREIGN PATENT DOCUMENTS

| EP | 0158812 A1 | | 10/1995 |
| FR | 2742912 A1 | | 6/1997 |
| JP | 7 218672 | | 8/1995 |
| JP | 09 145879 | | 6/1997 |
| JP | 09145879 A | * | 6/1997 |
| JP | 10170679 A | * | 6/1998 |
| JP | 10 170679 | | 6/2009 |

* cited by examiner

*Primary Examiner* — Jack W Keith  
*Assistant Examiner* — Marshall O'Connor  
(74) *Attorney, Agent, or Firm* — Davidson, Davidson & Kappel, LLC

(57) ABSTRACT

A fixed cluster for the core of pressurized-water nuclear reactor including rods and a holder for rods. The holder includes: an upper head; fins extending radially towards the outside from the upper head; systems for mounting the rods and distributed on the fins; and at least two abutment elements on the upper plate of the core, each of the abutment elements protruding longitudinally from a respective fin beyond the mounting systems so as to be vertically oriented towards the top when the fixed cluster is provided on a nuclear fuel assembly.

15 Claims, 4 Drawing Sheets

FIXED CLUSTER HAVING A SPIDER-LIKE SUPPORT, CORRESPONDING PRESSURIZED WATER NUCLEAR REACTOR CORE AND ASSEMBLY COMPRISING A NUCLEAR FUEL ASSEMBLY AND SUCH A FIXED CLUSTER

The present invention relates to a fixed cluster for a pressurized water nuclear reactor core of the type comprising:

rods which are intended to be inserted into guide tubes of a nuclear fuel assembly, a support for the rods from which the rods extend in a longitudinal direction in a direction which is intended to be orientated vertically downwards when the fixed cluster is arranged on a nuclear fuel assembly, and at least one element for longitudinal abutment against the upper plate of the core of the nuclear reactor.

BACKGROUND

In conventional manner, a nuclear fuel assembly comprises a bundle of nuclear fuel rods and a support skeleton for these rods. The skeleton comprises a lower nozzle, an upper nozzle and guide tubes which connect these two nozzles and which are intended to receive the rods of movable clusters for controlling the operation of the core of the nuclear reactor.

Each movable cluster comprises a bundle of neutron-absorbing rods which are retained by a support. This support is generally referred to as a "spider" and is constituted by an upper head around which fins are distributed and are provided with members for mounting the neutron-absorbing rods.

During an operating cycle of the core, the movable clusters will be displaced in order to introduce to a greater or lesser extent their rods into the corresponding guide tubes and thus to control the reactivity in the core of the nuclear reactor.

In a nuclear reactor core, some nuclear fuel assemblies are not provided with movable clusters but instead are provided with clusters which are referred to as fixed clusters since they are not subjected to controlled movement during an operating cycle of the core.

This is particularly the case for burnable poison clusters. At least some of the rods thereof comprise a burnable neutron poison which will allow the concentration of boron dissolved in the water of the cooling system to be reduced, primarily at the beginning of a cycle.

This is also the case for end plug clusters with which some assemblies are provided. The rods of these end plug clusters occupy the guide tubes of the relevant assemblies in order to limit the hydraulic flow around the adjacent fuel assemblies which are themselves provided with movable clusters.

This is also the case for neutron source clusters. These clusters which may be primary source clusters or secondary source clusters are involved in the start-up phases in order to initiate the reaction and/or calibrate the counting chains of the nuclear reactor.

Document JP-7/218 672 discloses a fixed cluster of the above-mentioned type which is, more specifically, a burnable poison cluster.

The rod support is constituted by a perforated plate which is provided at the center thereof with a cylindrical guide which extends upwards. This cylindrical guide can slide vertically relative to a bar which is in abutment below the upper plate of the core. The yoke arm extends through the water passage hole which is provided in the upper plate of the core above the relevant nuclear fuel assembly. A spring extends around the cylindrical guide between the rod support and the yoke arm. The spring acts counter to the upward movement of the support under the action of the hydraulic force of the water of the cooling system.

Generally, movable clusters bring about lower pressure drops in the water of the cooling system than fixed clusters. In this manner, the ascending flow rate of the water of the cooling system will be greater through the assemblies which are provided with movable clusters than in assemblies which are provided with fixed clusters.

This excess flow will become evident as an increased application force of the rods of the movable clusters in the cluster guides arranged above the upper core plate and with significant vibrations of the rods. These vibrations are caused by the flows of water which tend to develop, downstream of the assemblies which have an excessive supply of water from the cooling system and the assemblies which have an inadequate supply, in order to rebalance the distribution of water.

In order to reduce the pressure drops caused by the fixed clusters, and therefore to reduce the above-mentioned difficulties, JP-7/218 672 has modified the shape of the rods of a fixed cluster in order to increase the flow rate inside the guide tubes of the nuclear fuel assembly.

Although this solution allows the pressure drop to be reduced, it is also accompanied by a degradation of the cooling of the nuclear fuel rods of the associated assembly, since water flows in preference in the guide tubes rather than around the nuclear fuel rods.

SUMMARY OF THE INVENTION

An object of the invention is therefore to solve this problem by providing a fixed cluster of the above-mentioned type which brings about smaller pressure drops in the water of the cooling system without impairing the performance of the core.

The invention provides a fixed cluster of the above-mentioned type, characterised in that the support comprises:

an upper head which has a longitudinal center axis, fins which extend radially outwards from the upper head, systems for mounting the rods so as to be distributed on the fins, and at least two elements for abutment against the upper plate of the core, which abutment elements each protrude longitudinally from a respective fin, beyond the mounting systems, in a direction which is intended to be orientated vertically upwards when the fixed cluster is arranged on a nuclear fuel assembly.

According to specific embodiments, the fixed cluster may comprise one or more of the following features, taken in isolation or according to any technically possible combination:

the abutment elements are arranged angularly about the longitudinal center axis in a substantially regular manner;

the support comprises two abutment elements which are arranged in a substantially diametrically opposed manner relative to the longitudinal center axis;

at least one portion of the upper head and the fins are integral;

the mounting systems comprise members for receiving the upper ends of the rods and the nuts which are screwed to the upper ends in order to fix rods in the receiving members;

the nuts protrude longitudinally from the members in a direction which is intended to be orientated vertically upwards when the fixed cluster is arranged on a nuclear fuel assembly, and nuts are arranged at various levels along the longitudinal center axis;

the upper ends of the rods comprise shanks which extend through the nuts and which are welded to the nuts; and at least one fin comprises a passage for receiving an instrument.

The invention also provides a core of a pressurized water nuclear reactor comprising an upper plate, a lower plate and nuclear fuel assemblies which are arranged between the upper plate and lower plate, the core further comprising fixed clusters and movable clusters which are arranged on respective nuclear fuel assemblies, the fixed clusters each comprising:

rods which are intended to be inserted into guide tubes of the respective nuclear fuel assembly, a support for the rods from which the rods extend in a longitudinal direction in a direction which is intended to be orientated vertically downwards when the fixed cluster is arranged on the respective nuclear fuel assembly, at least one element for longitudinal abutment against the upper plate of the core of the nuclear reactor, characterised in that at least one of the fixed clusters is a fixed cluster as defined above, the abutment elements of the fixed cluster being in vertical abutment against the upper plate around a water passage hole which is provided in the upper plate above the nuclear fuel assembly on which the fixed cluster is arranged.

According to one variant, at least one movable cluster comprises:

rods which are intended to be inserted into guide tubes of the respective nuclear fuel assembly, a support for the rods from which the rods extend in a longitudinal direction in a direction which is intended to be orientated vertically downwards when the movable cluster is arranged on the respective nuclear fuel assembly;

the shapes of the supports for the fixed cluster and the movable cluster are similar.

According to another variant, the fixed cluster and the movable cluster are adjacent.

The invention also provides an assembly comprising a nuclear fuel assembly and a fixed cluster which is capable of being arranged on the nuclear fuel assembly, characterised in that the fixed cluster is a fixed cluster as defined above.

BRIEF DESCRIPTION OF THE DRAWINGS

The invention will be better understood from a reading of the following description, given purely by way of example and with reference to the appended drawings, in which.

DETAILED DESCRIPTION

Figure 1:
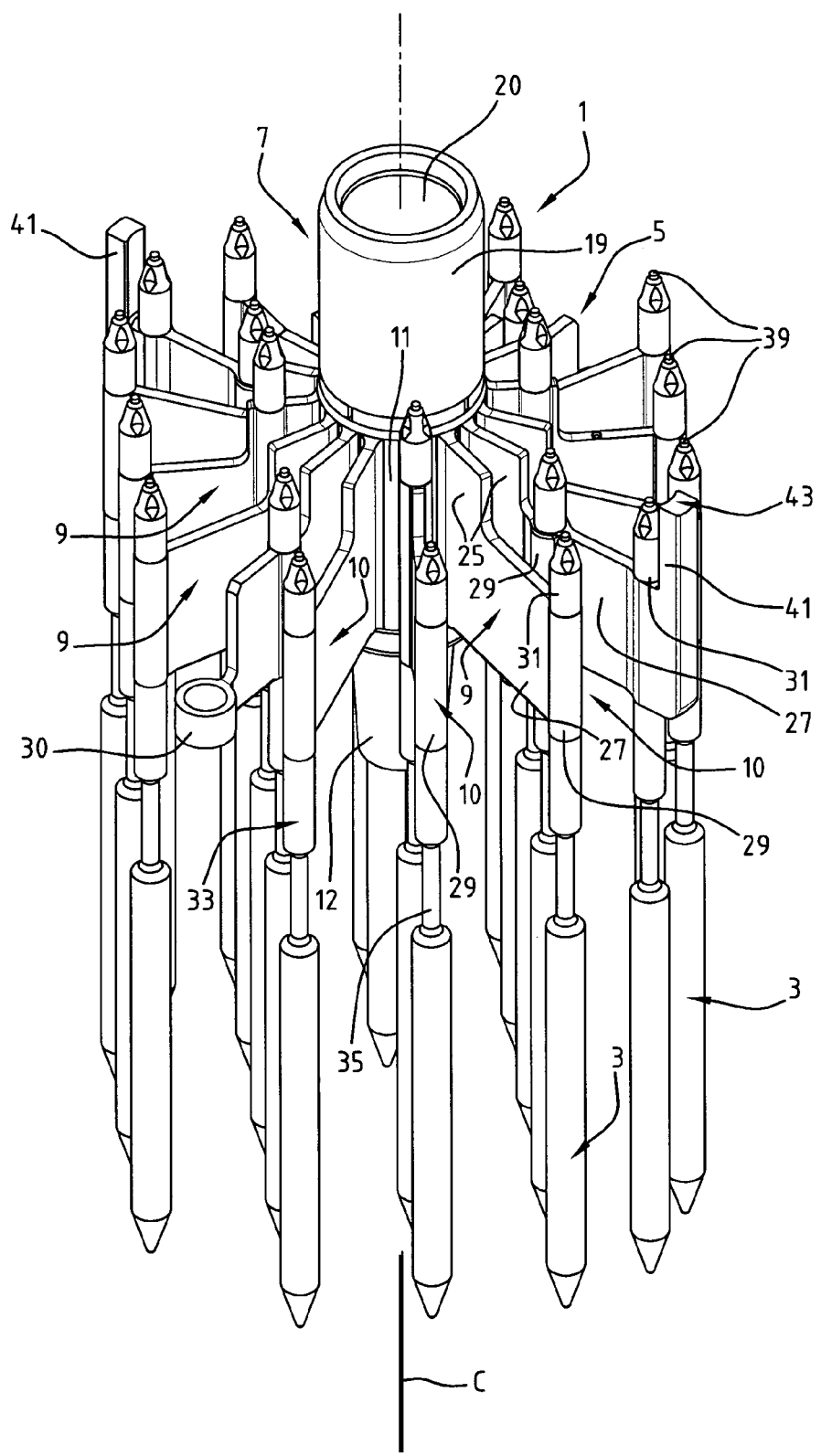
FIG. 1 is a schematic perspective view of a fixed cluster according to a first embodiment of the invention.

FIG. 1 illustrates a fixed cluster 1 for a pressurized water nuclear reactor (PWR). It is, for example, an end plug assembly.

The cluster 1 principally comprises rods 3 and a support 5.

The support 5 has a shape which is generally similar to that used in the prior art for movable clusters, with the exception of the main differences which are highlighted in the remainder of the description.

This support 5, which can therefore be referred to as a "spider", principally comprises:

an upper head 7 whose longitudinal center axis C is intended to be orientated vertically when the cluster 1 is arranged on a nuclear fuel assembly in a nuclear reactor core, fins 9 which extend radially outwards from the upper head 7 and which are distributed angularly in a substantially regular manner about the axis C, and systems 10 for mounting the rods 3 on the support 5.

The support 5 is produced from metal which withstands radiation, for example, steel such as the steel AISI 304.

The upper head 7 has a hollow cylindrical shape with a circular base. It comprises a lower portion 11 from which the fins 9 extend. This lower portion 11 is, for example, integral with the fins 9, as described in document FR-2 742 912 and the corresponding document U.S. Pat. No. 5,889,832. The lower portion 11 of the upper head 7 and the fins 9 can be produced by means of moulding, machining or electro-erosion.

The support 5 further comprises a back up ring 12 on the upper nozzle of the nuclear fuel assembly with which the cluster 1 is intended to be associated. This ring 12 comprises a collar 13 (FIG. 3) which may press downwards against a lower edge 15 of the upper head 7. The collar 13 is thus retained inside the central hole 17 provided in the upper head 7.

The upper portion 19 of the upper head 7 is attached to the lower portion 11 and is fixed thereto, for example, by means of screwing, welding, soldering or adhesive-bonding. In the upper portion 19, the hole 17 terminates in an upper portion 20 which forms a cavity for coupling the upper head 7 to a tool for handling the fixed cluster 1.

A thrust spring 21 is arranged in the hole 17 and is supported with the lower end thereof on the collar 13 and with the upper end thereof on an internal partition 23 which is provided inside the upper portion 19 of the upper head 7.

The ring 12 can be moved by means of translation between a lowered position (FIGS. 1 and 3) and a raised position which is not illustrated. The spring 21 is compressed when the ring 12 moves into the raised position and returns the ring 12 towards the lowered position thereof.

The fins 9 each comprise a radially inner portion 25 and a radially outer portion 27. The inner portions 25 have heights, taken along the center axis C, greater than those of the outer portions 27.

The mounting systems 10 comprise members 29 for receiving the rods 3 and nuts 31 for fixing the rods 3 in the members 29.

The members 29 are distributed on the fins 9 in a pattern which is similar to that of the distribution of the guide tubes in the nuclear fuel assembly for which the cluster 1 must be provided. This distribution can be seen in particular in FIG. 2.

The majority of the fins 9 are provided with two members 29. Some of the members 29 are provided on inner portions 25 and others on outer portions 27. The members 29 have substantially the same height, taken along the axis C, as the portion 25 or 27 on which they are provided. However, a fin 9 may comprise, at a location corresponding to a guide tube, a passage 30 for receiving an instrument in place of a member 29.

Each member 29 is provided for receiving an extension 33 of the end plug of a rod 3. In the example illustrated, each extension 33 comprises a portion 35 having a reduced cross-section, then extends through a hole 37 provided in the corresponding member 29. A nut 31 is screwed onto the upper end of the extension 33, this upper end protruding upwards beyond the relevant member 29. An end shank 39 protrudes upwards from the upper end of the extension 33 and extends through the nut 31. This end shank 39 has been molten and welded to the nut 31, thus blocking the nut 31 in terms of rotation relative to the rod 3 in question.

The rods 3 are thus fixed to the support 5 and extend downwards from the support, parallel with the axis C. The rods 3 form a bundle with a distribution which corresponds to that of the members 29 and therefore that of the guide tubes of the nuclear fuel assembly for which the cluster 1 is intended.

The members 29 are, in the example illustrated, integral with the fins 9 and have been produced at the same time as the fins and the lower portion 11 of the upper head 7.

In contrast to what has been provided in the prior art for movable clusters, the fixed cluster 1 according to the invention comprises two fins 9 which have a greater radial length and whose radial ends are extended longitudinally upwards, each by an element 41 for support on the upper core plate of a nuclear reactor.

In the example illustrated, the cluster 1 comprises two elements 41 which are provided on fins 9 which are diametrically opposed relative to the center axis C.

Since the abutment elements 41 have a similar structure, only one will be described below.

The abutment element 41 is in the form of a bar and it is integral with the fin 9. The abutment element 41 is therefore a rigid and solid element with significant radial spacing relative to the upper head 7.

The abutment element 41 is arranged radially outwards relative to the adjacent nut 31 and protrudes upwards from the outer portion 27 of the associated fin 9 beyond the nut 31 in question. This can be seen in particular in FIG. 3.

The radially inner surface 43 (FIG. 1) of the support element 41 is concave in the example illustrated in order to allow a tool to manoeuvre the nut 31.

Figure 2:
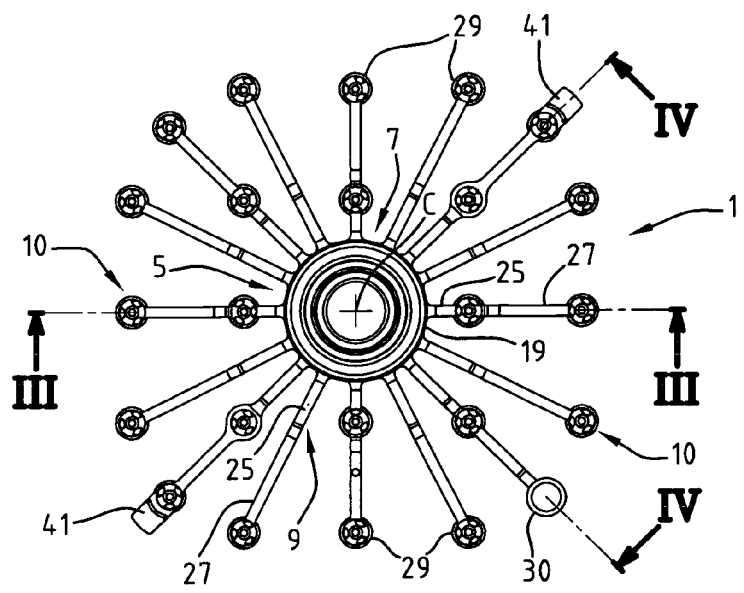
FIG. 2 is a schematic plan view of the cluster of FIG. 1.
Figure 3:
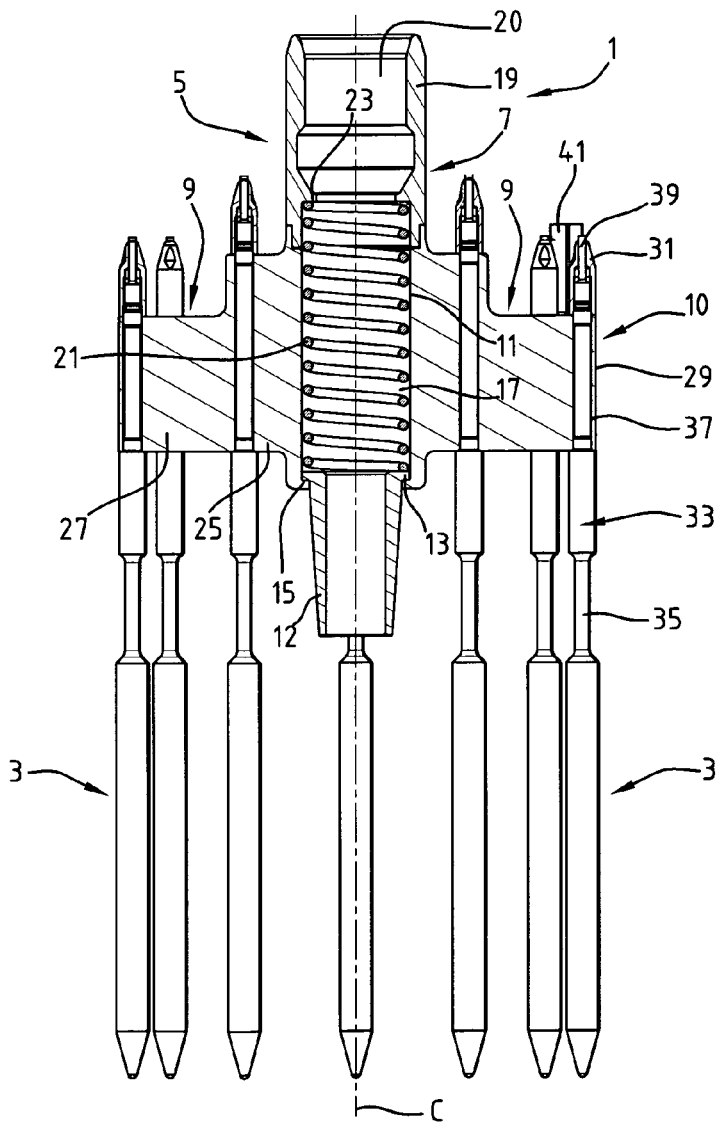
FIG. 3 is a schematic section taken along line of FIG. 2.
Figure 4:
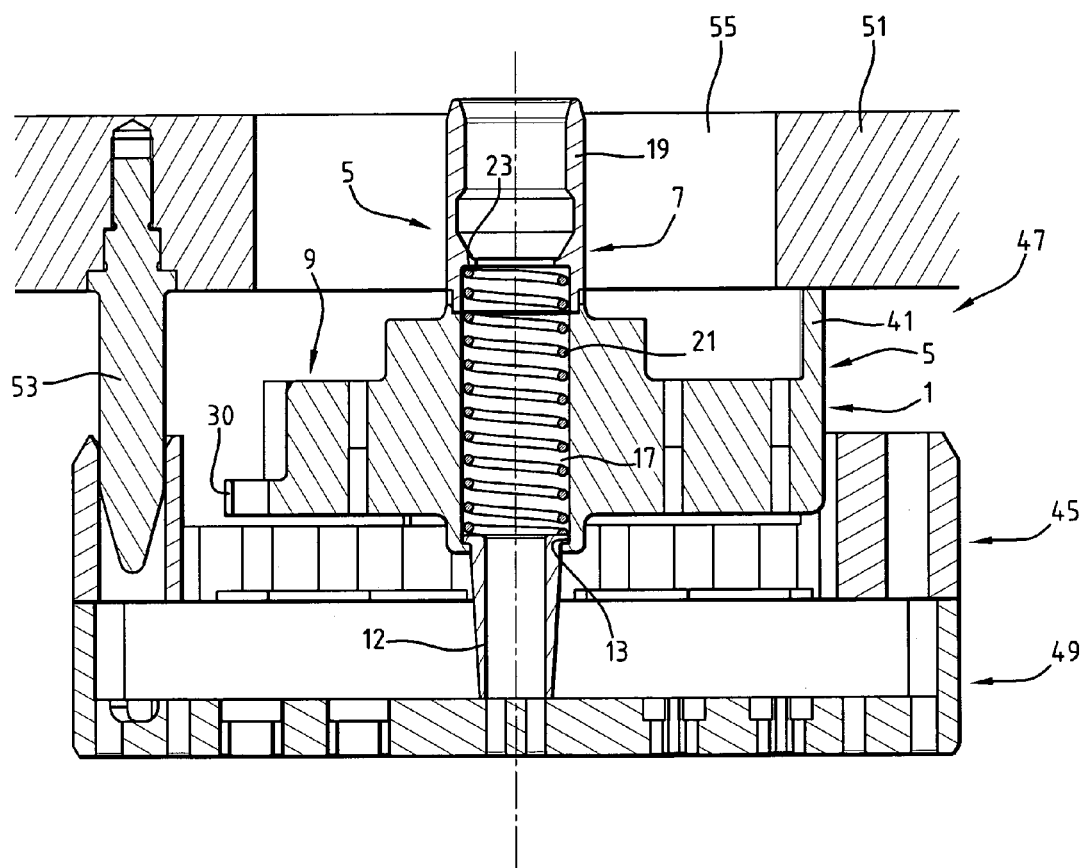
FIG. 4 is a partial schematic section along the broken line IV-IV of FIG. 2, illustrating the abutment of the cluster of FIG. 1 against an upper core plate of the nuclear reactor.

FIG. 4 illustrates the cluster 1 of FIGS. 1 to 3 which is provided in a nuclear fuel assembly 45 in a core 47 of a pressurized water nuclear reactor.

In FIG. 4, only the support 5 of the cluster 1 has been illustrated and the rods 3 have not been illustrated. For the assembly 45, only the upper nozzle 49 is visible. It is also possible to see in this FIG. 4 a portion of the upper plate 51 of the core 47 and a pin 53 for positioning the assembly 45.

In conventional manner, a hole 55 for the passage of water is provided in the upper plate 51 opposite the upper nozzle 49 of the assembly 45.

In contrast to what has been provided in the prior art, the hole 55 is not partially blocked by a yoke arm of the fixed cluster 1 but instead the abutment of the fixed cluster 1 on the upper plate 51 is provided by the elements 41. More specifically, the elements 41 are in longitudinal abutment against the upper plate 51 around the hole 55.

The cluster 1 is further in abutment against the upper nozzle 49 of the assembly 45 via the ring 12, thus compressing the spring 21. For reasons of simplification, this compression of the spring 21 has not been illustrated in FIG. 4.

As indicated above, owing to the presence of the support elements 41, it is not necessary to provide a yoke arm which extends through the hole 55. The pressure drop brought about by the fixed cluster 1 is therefore reduced. This pressure drop is further reduced owing to the use of a support 5 which is in the form of a spider, that is to say, with a central upper head 7 and fins 9 which are distributed around it.

Figure 5:
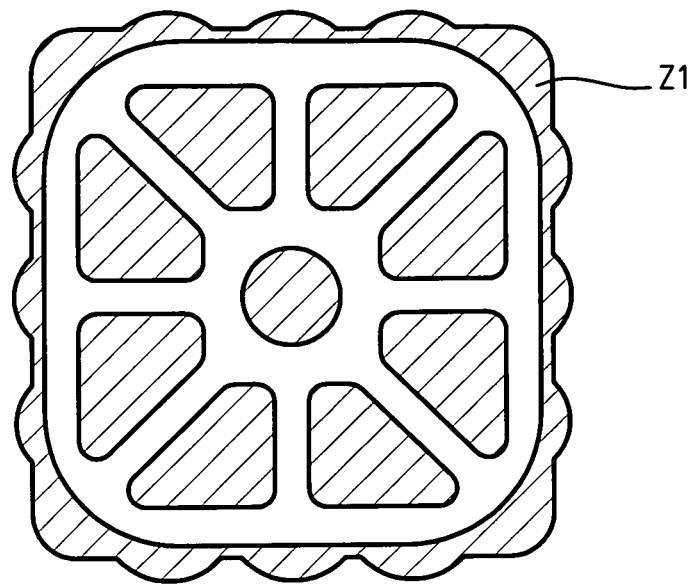
FIGS. 5 and 6 are schematic plan views illustrating the flow cross-sections of the water of the cooling system around a fixed cluster according to the prior art and according to the invention.
Figure 6:
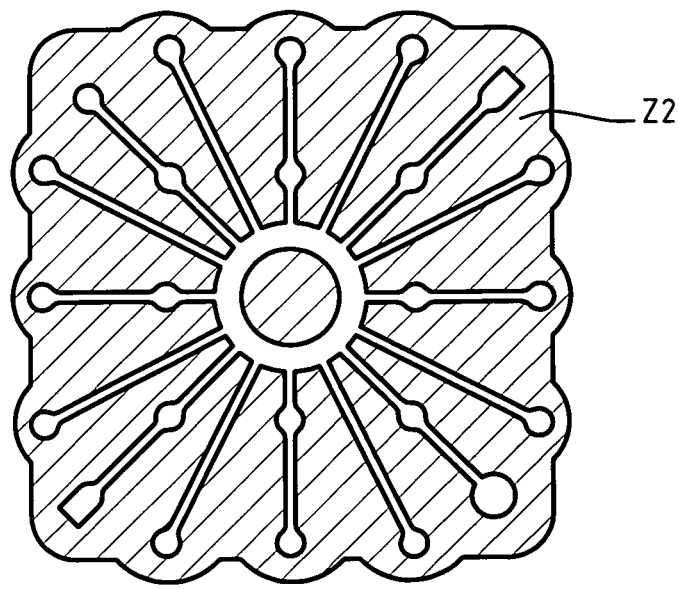

This is illustrated by FIGS. 5 and 6 where the cross-hatched zones correspond to the flow cross-sections of the water of the cooling system downstream of the upper nozzle of a nuclear fuel assembly. The surface of the water flow cross-section Z2 with a fixed cluster 1 according to the invention (FIG. 6) is approximately 50% greater than the flow cross-section Z1 of a fixed cluster according to the prior art (FIG. 5).

The pressure drop is further reduced owing to the streamlined shape of the support 5 and the fact that the spring 21 is arranged inside the upper head 7 and not at the outer side of the support 5 as in the prior art for fixed clusters.

Furthermore, this reduction of the pressure drop is not accompanied by a deterioration of the cooling of the nuclear fuel rods and does not therefore impair the performance of the core.

The use of a support 5 which has a spider-like structure also allows the structure of fixed clusters to be made more similar to that of movable clusters and therefore allows the differences between the pressure losses brought about by the different clusters within the same core 47 to be reduced.

In this manner, in a preferred embodiment, in a nuclear reactor core 47, fixed and movable clusters 1 are used with supports 5 which have spider-like shapes. The distribution of water is more homogeneous in the nuclear fuel assemblies which prevents the associated problems, and in particular the transverse balancing flows.

Furthermore, such a core 47 also allows a single type of handling tool to be used in order to manipulate the fixed clusters and the movable clusters.

It can be seen that, in such a core, the shapes of the movable cluster supports may be slightly different from those of the fixed clusters, in particular in that they do not comprise an abutment element 41 which would prevent their free passage through the water passage hole 55 of the upper plate 51 of the core 47. In the same manner, only some movable and fixed clusters 1 may have supports 5 with similar shapes. Preferably, such movable and fixed clusters 1 with similar supports will be adjacent in the core 47.

It can also be seen that, in the fixed cluster 1 of FIGS. 1 to 4, the position of the nuts 31 at different levels along the center axis C also allows the engagement of a handling tool to be facilitated.

The engagement of such a tool, which comprises a housing for receiving the upper head 7 and the nuts 31, is carried out first of all via the upper portion 19 of the upper head 7, then via the nuts 31 which are located at the highest level and finally by the nuts 31 which are located at the lowest level.

The stepped engagement of the nuts 31 allows it to be ensured that the relative position of the tool and the support 5 is correct and therefore allows this engagement to be carried out more rapidly.

Furthermore, it can be seen that the retention force applied by the fixed cluster 1 to the fuel assembly 45 is greatly reduced compared with that of the prior art, since the spring 21 does not have to absorb all the hydraulic forces applied to the cluster 1 by the water of the cooling system. In the fixed cluster 1 of FIGS. 1 to 4, this absorption is provided directly by the abutment elements 41.

In the prior art, the service-life of end plug clusters is often limited by the ageing of the spring. Since the spring 21 of the fixed cluster 1 is subject to fewer stresses, the service-life of the fixed cluster 1 is increased which allows the quantity of radioactive waste produced by the use of a nuclear reactor to be reduced.

In the fixed cluster of FIGS. 1 to 4, the spring 21 therefore has the sole function of retaining the fixed cluster 1 in contact with the upper nozzle 49 and the force applied to the assembly 45 can therefore be reduced by at least 50% at the beginning of the service-life. This reduction of the force allows the deformation of the assembly 45 to be limited during operation.

Furthermore, it can be seen that the support 5 comprises a smaller number of components owing, on the one hand, to the integral construction of the lower portion 11 of the upper head 7, the fins 9 and the members 29 and, on the other hand, to the blocking in terms of rotation of the nuts 31 by means of welding the shanks 39, which allows conventional pin-type stopping systems to be dispensed with.

However, it will be seen that the support 5 may have a structure which is different from that described above, and, for example, be produced from a greater number of components. In this manner, by way of example, the fins 9 may have branches from which a plurality of fin portions extend, as described in EP-158 812. In the same manner, the number of passages 30 for receiving instruments and their positions may vary.

Furthermore, the systems 10 for mounting rods may be different from those described above.

In the example described above, two abutment elements 41 have been provided but this number may also vary in accordance with the requirements and limitations specific to the geometries of the reactors to be equipped, and in particular the position, the size and the shape of the water passage holes 55 of the upper plate 51 of the core 47. Preferably, the abutment elements are angularly distributed in a substantially regular manner about the axis C.

Finally, since the abutment elements 41 are located radially at the outer side relative to the adjacent mounting systems 10, and therefore the adjacent rods 3, the fixed cluster 1 can be used at all locations of the core, and not only at those corresponding to the smaller holes 55. The cluster 1 therefore allows standardisation to be increased and costs to be limited.

The invention claimed is:

1. A fixed cluster for a pressurized water nuclear reactor core comprising:
   rods to be inserted into guide tubes of a nuclear fuel assembly; and
   a support for the rods from which the rods extend in a longitudinal direction the longitudinal direction being orientated vertically downwards when the fixed cluster is arranged on the nuclear fuel assembly;
the support including:
   an upper head having a longitudinal center axis;
   fins extending radially outwards from the upper head;
   systems for mounting the rods so as to be distributed on the fins; and
   at least two elements for abutment against the upper plate of the core, the abutment elements each protruding longitudinally from the respective fins, beyond the mounting systems, in a direction vertically upwards when the fixed cluster is arranged on a nuclear fuel assembly, the abutment elements being arranged radially outwards relative to the adjacent mounting systems,
   wherein each abutment element is arranged radially outwards relative to all of the rods supported by the respective fin the abutment element protrudes longitudinally from.

2. The cluster according to claim 1 wherein the abutment elements are located at radially outer ends of the fins.

3. The cluster according to claim 1 wherein the abutment elements are arranged angularly about the longitudinal center axis in a regular manner.

4. The cluster according to claim 3 wherein the support includes two abutment elements arranged in a diametrically opposed manner relative to the longitudinal center axis.

5. The cluster according to claim 1 wherein at least one portion of the upper head and the fins are integral.

6. The cluster according to claim 1 wherein the mounting systems include members for receiving upper ends of the rods and nuts which are screwed to the upper ends to fix the rods in receiving members.

7. The cluster according to claim 6 wherein the nuts protrude longitudinally from the members in a direction vertically upwards when the fixed cluster is arranged on the nuclear fuel assembly, and wherein the nuts are arranged at various levels along the longitudinal center axis.

8. The cluster according to claim 6 wherein the upper ends of the rods include shanks which extend through the nuts and are welded to the nuts.

9. The cluster according to claim 1 wherein at least one fin includes a passage for receiving an instrument.

10. A core of a pressurized water nuclear reactor comprising:
   an upper plate;
   a lower plate; and
   nuclear fuel assemblies which are arranged between the upper plate and lower plate, the core further comprising fixed clusters and movable clusters which are arranged on respective nuclear fuel assemblies, the fixed clusters each comprising:
   rods which are intended to be inserted into guide tubes of the respective nuclear fuel assembly;
   a support for the rods from which the rods extend in a longitudinal direction, the longitudinal direction being vertically downwards when the fixed cluster is arranged on the respective nuclear fuel assembly; and
   at least one element for longitudinal abutment against the upper plate of the core of the nuclear reactor;
   wherein at least one of the fixed clusters is a fixed cluster according to claim 1, the abutment elements of the fixed cluster being in vertical abutment against the upper plate around a water passage hole which is provided in the upper plate above the nuclear fuel assembly on which the fixed cluster is arranged.

11. The core according to claim 10 wherein at least one movable cluster comprises:
   rods which are intended to be inserted into the guide tubes of the respective nuclear fuel assembly; and
   a rod support from which the rods extend in a longitudinal direction, the longitudinal direction being vertically downwards when the movable cluster is arranged on the respective nuclear fuel assembly;
wherein the shapes of the supports for the fixed cluster and the movable cluster are similar.

12. The core according to claim 11 wherein the fixed cluster and the movable cluster are adjacent.

13. An assembly comprising a nuclear fuel assembly and a fixed cluster which is capable of being arranged on the nuclear fuel assembly wherein the fixed cluster is a fixed cluster according to claim 1.

14. The cluster according to claim 1 wherein the abutment elements do not mount any of the rods on the fins.

15. The cluster according to claim 1 wherein the abutment elements are integral with the respective fins, forming rigid and solid elements.

* * * * *